(12) United States Patent
Hou et al.

(10) Patent No.: US 11,086,356 B2
(45) Date of Patent: Aug. 10, 2021

(54) FOLDABLE SUPPORT DEVICE AND FOLDABLE FLEXIBLE DISPLAY DEVICE

(71) Applicant: Yungu (Gu'an) Technology Co., Ltd., Langfang (CN)

(72) Inventors: Hongqi Hou, Langfang (CN); Zhaoji Zhu, Langfang (CN); Liwei Ding, Langfang (CN); Fu Liao, Langfang (CN); Kanglong Sun, Langfang (CN); Yuhua Wu, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 16/871,235

(22) Filed: May 11, 2020

(65) Prior Publication Data

US 2020/0272200 A1 Aug. 27, 2020

Related U.S. Application Data

(63) Continuation of application No. PCT/CN2019/072353, filed on Jan. 18, 2019.

(30) Foreign Application Priority Data

Sep. 19, 2018 (CN) .......................... 201811095939.5

(51) Int. Cl.
*G06F 1/16* (2006.01)

(52) U.S. Cl.
CPC .......... *G06F 1/1618* (2013.01); *G06F 1/1652* (2013.01)

(58) Field of Classification Search
CPC .... G06F 1/1618; G06F 1/1652; G06F 1/1681; G06F 1/1616; G06F 1/1624;
(Continued)

(56) References Cited

U.S. PATENT DOCUMENTS

| 9,874,048 | B1 | 1/2018 | Hsu |
| 10,352,354 | B1* | 7/2019 | Hsu ....................... G06F 1/1652 |

(Continued)

FOREIGN PATENT DOCUMENTS

| CN | 1816268 A | 8/2006 |
| CN | 102693683 A | 9/2012 |

(Continued)

OTHER PUBLICATIONS

Taiwan First Office Action dated Nov. 7, 2019 in Taiwan Application No. 108103750.

(Continued)

*Primary Examiner* — Hung S. Bui
*Assistant Examiner* — Sagar Shrestha
(74) *Attorney, Agent, or Firm* — Ladas & Parry LLP

(57) ABSTRACT

Embodiments of the present application provide a foldable support device, including: a driving component and a support component connected with the driving component; and a rotating gear and a rack intermeshing with each other and connected with the driving component and the support component. The driving component and the support component are disposed on a non-display surface of a flexible display panel; and the flexible display panel is folded or unfolded with intermeshing rotating and relative moving of the rotating gear and the rack. By setting the rotating gear and the rack, when the flexible display panel is folding, the rotating gear rotates along the rack and drives the support component to move away from the driving component. Sufficient storage space is generated for the flexible display panel while folding to effectively prevent the display failure caused by folding of the flexible display panel.

20 Claims, 5 Drawing Sheets

(58) Field of Classification Search
CPC ..... G06F 2203/04102; E05Y 2201/722; E05Y 2900/606; E05D 3/122; H04M 1/0268; H04M 1/022; G09F 9/301; F16C 11/04
See application file for complete search history.

(56) References Cited

U.S. PATENT DOCUMENTS

| | | | |
|---|---|---|---|
| 10,423,019 B1* | 9/2019 | Song | G06F 1/1652 |
| 10,551,880 B1* | 2/2020 | Ai | H04M 1/0216 |
| 2012/0149438 A1* | 6/2012 | Kwon | H04M 1/022 |
| | | | 455/566 |
| 2013/0083496 A1* | 4/2013 | Franklin | H01M 10/0436 |
| | | | 361/749 |
| 2014/0360296 A1* | 12/2014 | Hsu | G06F 1/1618 |
| | | | 74/98 |
| 2016/0060927 A1* | 3/2016 | Xu | G06F 1/1681 |
| | | | 361/679.55 |
| 2016/0227645 A1* | 8/2016 | Hampton | G06F 1/1616 |
| 2016/0273739 A1 | 9/2016 | Endo | |
| 2018/0024589 A1* | 1/2018 | Nakamura | G06F 1/166 |
| | | | 361/679.09 |
| 2018/0039250 A1* | 2/2018 | Liang | G05B 19/402 |
| 2018/0210513 A1* | 7/2018 | Lin | G06F 1/1681 |
| 2018/0324964 A1* | 11/2018 | Yoo | G06F 1/1681 |
| 2019/0163241 A1* | 5/2019 | Moon | G06F 1/1605 |
| 2020/0042048 A1* | 2/2020 | Quinn | H05K 7/1401 |

FOREIGN PATENT DOCUMENTS

| | | |
|---|---|---|
| CN | 104464531 A | 3/2015 |
| CN | 104485055 A | 4/2015 |
| CN | 104809957 A | 7/2015 |
| CN | 106601130 A | 4/2017 |
| CN | 106788536 A | 5/2017 |
| CN | 106875846 A | 6/2017 |
| CN | 206282175 U | 6/2017 |
| CN | 107831836 A | 3/2018 |
| CN | 108028029 A | 5/2018 |
| CN | 108922408 | 11/2018 |
| TW | M562989 U | 7/2018 |

OTHER PUBLICATIONS

English Translation of the Taiwanese Office Action.
PCT International Search Report of PCT/CN2019/072353 dated Jun. 24, 2019 and English Translation.
PCT Written Opinion of PCT/CN2019/072353 dated Jun. 24, 2019 and English Translation.
European Search Result in Application No. 19862787.9 dated Apr. 7, 2021.

\* cited by examiner

FOLDABLE SUPPORT DEVICE AND FOLDABLE FLEXIBLE DISPLAY DEVICE

CROSS-REFERENCE TO RELATED APPLICATIONS

This application is a continuation of International Application No. PCT/CN2019/072353 filed on Jan. 18, 2019, which claims priority to Chinese patent application No. 201811095939.5 filed on Sep. 19, 2018. Both applications are incorporated herein by reference in their entireties.

TECHNICAL FIELD

Embodiments of the present application relate to the field of display panel technology, and in particular to a foldable support device and a foldable flexible display device.

BACKGROUND

A flexible display panel with Organic Light-Emitting Diode (OLED) has characteristics of self-illumination, low power consumption and flexible folding. At present, based on the flexible display panel having an advantage of flexible folding, display terminal products such as mobile phones and tablets have been developed to be flexible, and a technology of a folding display panel has been developed faster and faster. But due to a limitation of a folding structure, the folding display panel still has a phenomenon that a folding area is easy to form "dead folds", which leads to a failed display and an unnormal display.

SUMMARY

In view of this, embodiments of the present application provide a foldable support device in order to solve the problem that a flexible foldable display panel in the prior art fails to display due to folding.

According to one aspect of the present application, an embodiment of the present application provides a foldable support device, including: a driving component and a support component connected with the driving component; and a rotating gear and a rack intermeshing with each other and connected with the driving component the support component. The driving component and the support component are disposed on a non-display surface of a flexible display panel; wherein the rotating gear and the rack intermesh with each other to rotate and have a relative movement therebetween to fold or unfold the flexible display panel.

In an embodiment of the present application, the rotating gear is connected with the driving component; the rack is connected with the support component; and the rotating gear rotates along the rack and moves relatively to the rack, driving the driving component connected with the rotating gear to move relatively to the support component connected with the rack.

In an embodiment of the present application, the rotating gear is connected with the support component; the rack is connected with the driving component; and the rotating gear rotates along the rack and moves relatively to the rack, driving the support component connected with the rotating gear to move relatively to the driving component connected with the rack.

In an embodiment of the present application, the support component includes at least one shell structure; the at least one shell structure is used for supporting and fixing a non-bending area of the flexible display panel.

In an embodiment of the present application, the foldable support device includes a plurality of racks and a plurality of rotating gears which are respectively meshed with the plurality of racks.

In an embodiment of the present application, the driving component further includes a rotating shaft, a rotating portion and a fixed portion, and the rotating portion is rotatably connected with the fixed portion through the rotating shaft.

In an embodiment of the present application, the rotating portion has a sliding portion disposed thereon, the at least one shell structure has a sliding channel disposed thereon, and the sliding portion is disposed in the sliding channel and slides along the sliding channel.

In an embodiment of the present application, the fixed portion has a slide groove fixed portion disposed thereon, the slide groove fixed portion has a slide groove disposed thereon, the rotating portion has an end slide block disposed thereon, and the end slide block is disposed in the slide groove and slides along the slide groove.

In an embodiment of the present application, the rotating portion has a plurality of the end slide blocks disposed thereon, the slide groove fixed portion has a plurality of the slide grooves corresponding to the plurality of the end slide blocks disposed thereon, and the plurality of the end slide blocks are respectively disposed in the plurality of the slide grooves.

In an embodiment of the present application, the slide groove is a linear slide groove, and an angle between a straight line direction of the slide groove and a plane where the flexible display panel located is greater than zero and less than ninety degrees.

In an embodiment of the present application, the rotating shaft includes a first rotating shaft and a second rotating shaft arranged in parallel, the rotating portion includes a first rotating portion and a second rotating portion respectively disposed at both ends of the fixed portion, the first rotating portion is rotatably connected with the fixed portion through the first rotating shaft, the second rotating portion is rotatably connected with the fixed portion through the second rotating shaft, a worm gear structure is disposed between the first rotating shaft and the second rotating shaft, and the first rotating shaft and the second rotating shaft are respectively connected with the worm gear structure.

In an embodiment of the present application, a shaft locking portion is disposed on the rotating shaft.

In an embodiment of the present application, the foldable support device further includes a bending driving mechanism connected to the rotating gear, and is used for driving the rotating gear to rotate along the rack and move relatively to the rack.

In an embodiment of the present application, the bending driving mechanism includes a motor.

According to another aspect of the present application, an embodiment of the present application provides a foldable flexible display device, including: a flexible display panel for performing a display function, and a foldable support device for supporting the flexible display panel, which includes the foldable support device according to the aboves.

In an embodiment of the present application, the flexible display panel includes: a circuit board disposed in the at least one shell structure, and used for providing a driving circuit required by the flexible display panel.

In an embodiment of the present application, the circuit board includes a flexible circuit board.

In an embodiment of the present application, the flexible display panel includes: a battery disposed in the at least one shell structure, and used for providing power required by the circuit board.

In an embodiment of the present application, the battery includes a flexible battery.

The embodiments of the present application provide a foldable support device, which includes: a driving component and a support component connected with the driving component; and a rotating gear and a rack intermeshing with each other and connected with the driving component the support component. The driving component and the support component are disposed on a non-display surface of a flexible display panel; and the flexible display panel is folded or unfolded with intermeshing rotating and relative moving of the rotating gear and the rack. During a process of the foldable flexible display device from an unfolded state to a folded state, the greater a bending angle of the flexible display panel, the farther the support component is from the driving component. By setting the rotating gear and the rack, when the flexible display panel is folding, the rotating gear rotates along the rack and moves relatively to the rack, thereby driving the support component connected with one of the rotation gear and the rack to move to a direction that is away from the driving component connected with the other one of the rotation gear and the rack. Sufficient storage space is generated for the flexible display panel while folding to effectively prevent the display failure caused by folding of the flexible display panel.

DETAILED DESCRIPTION OF THE EMBODIMENTS

In order to make the purpose, technical means, and advantages of the present application clearer, the embodiments of the present application are further described in details below with reference to the accompanying drawings.

Figure 1A:
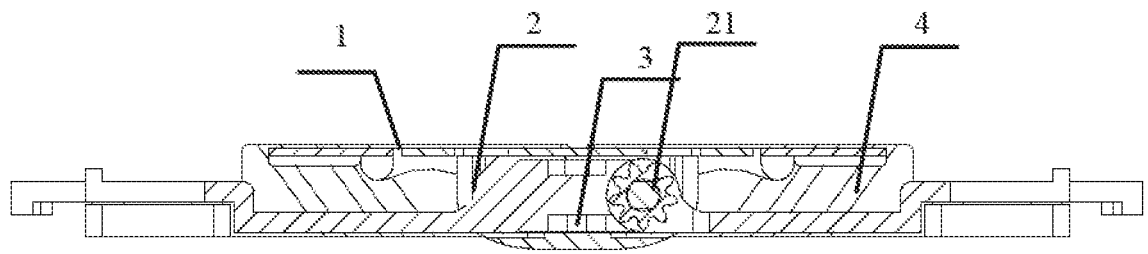
FIG. 1a is a schematic structural diagram of a foldable support device in an unfolded state according to an embodiment of the present application.
Figure 1B:
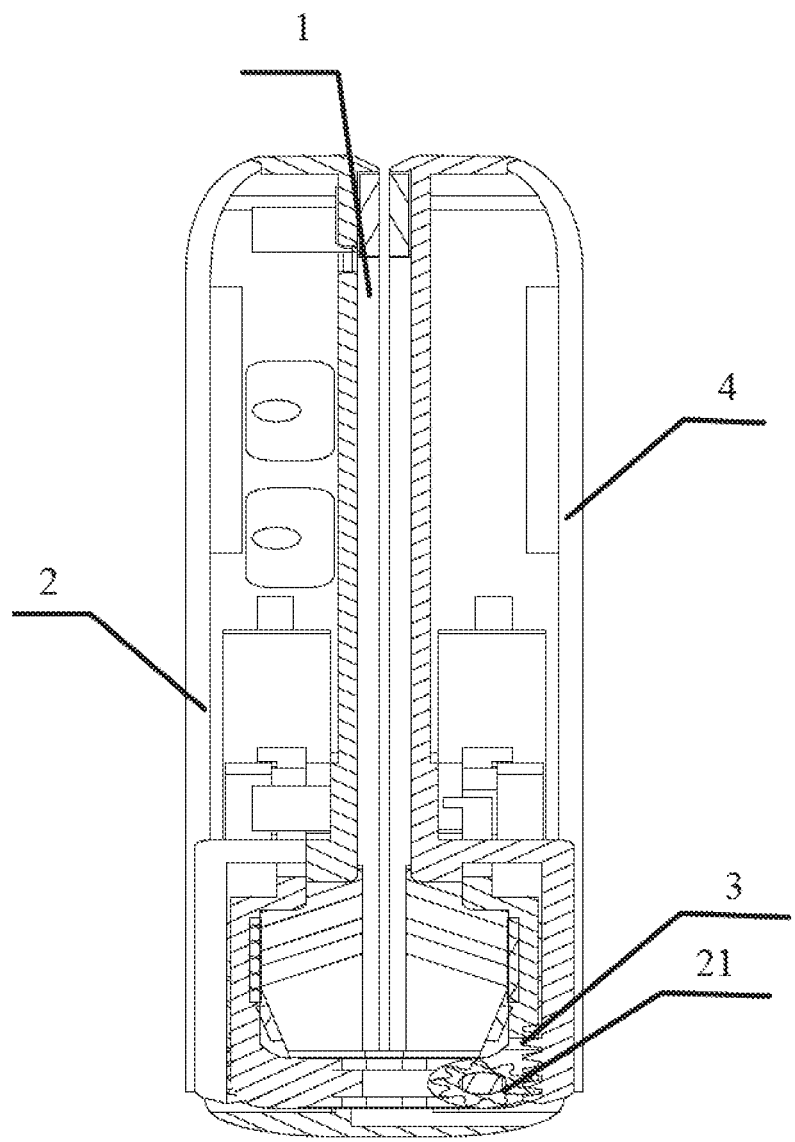
FIG. 1b is a schematic structural diagram of a foldable support device in a folded state according to an embodiment of the present application.

FIG. 1a and FIG. 1b are respective a schematic structural diagram of a foldable support device in an unfolded state and a folded state according to an embodiment of the present application. As shown in FIG. 1a and FIG. 1b, an embodiment of the application provides a foldable support device, including: a driving component 2 and a support component 4 both disposed on a non-display surface side of a flexible display panel 1. The non-display surface side of a flexible display panel 1 refers to the opposite surface of the display surface of the flexible display panel 1. The driving component 2 may be disposed in a bending area of the flexible display panel 1 and is used for realizing the folding or unfolding of the flexible display 1. The support component 4 is used for supporting and fixing a non-bending area of the flexible display panel 1. The foldable support device also includes a rotating gear 21 and a rack 3 intermeshing with each other and connected with the driving component 2 and the support component 4. One of the rack 3 and the rotating gear 21 is connected with the driving component 2 and the other one is connected with the support component 4. The rotating gear 21 rotates in mesh along the rack 3 and moves relatively to realize folding or unfolding the flexible display panel 1.

Figure 1C:
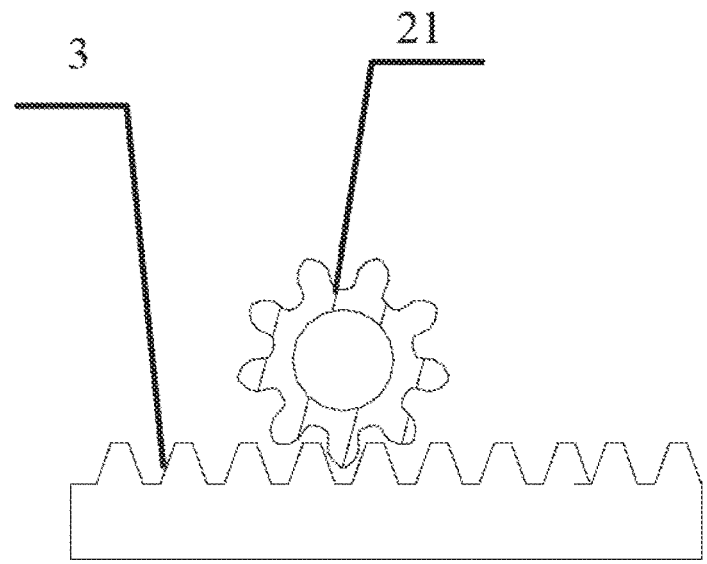
FIG. 1c is a schematic structural diagram of a rotating gear and a rack according to an embodiment of the present application.

In the following, the process implemented in an embodiment will be specifically described by taking the fixed connection between the rotating gear 21 and the driving component 2 and the fixed connection between the rack 3 and the support component 4 as example. As shown in FIG. 1c, When the flexible display panel 1 is folding, the rotating gear 21 rotates counterclockwise or clockwise, and the meshing structure of the rotating gear 21 and the rack 3 makes the rack 3 moving to right or left relatively to the rotating gear 21 (i.e. relatively to the driving component 2) on a plane where the rack 3 is located on, thereby driving the support component 4 connected with the rack 3 to move to right or left, and realizing the relative movement of the driving component 2 and the support component 4. And, during a process of the foldable flexible display device from an unfolded state to a folded state, the greater a bending angle of the flexible display panel, the farther the support component 4 is from the driving component 2. When the flexible display panel 1 is folding, the rack 3 meshes with the rotating gear 21 and drives the support component 4 to move away from the driving component 2, which generates enough storage space for the bending area of the flexible display panel 1. The excessive bending and squeezing of the bending area of the flexible display panel 1 caused by direct folding is prevented, and a folding angle is reduced by generating the storage space. A bending and squeezing amplitude are further reduced and the display failure of the flexible display panel 1 due to folding is effectively prevented. The unfolding process of the flexible display panel 1 is a reverse process of the folding process of the flexible display panel 1, i.e., when the flexible display panel 1 is unfolding, the rotating gear 21 rotates to drive the rack 3 to move and drive the support component 4 connected with the rack 3 to move towards the driving component 2 to realize the unfolding of the flexible display panel 1, which will not be described herein.

In another embodiment of the present application, the rotating gear 21 may be connected with the driving component 2; and the rack 3 is connected with the support component 4. When the flexible display panel 1 is folding, the rotating gear 21 rotates counterclockwise or clockwise, and moves to right or left relatively to the rack 3 on a plane where the rack 3 is located on, thereby driving the support component 4 connected with the rotating gear 21 to move to right or left, and realizing the relative movement of the driving component 2 and the support component 4 in order to fold the flexible display panel 1. The unfolding process of the flexible display panel 1 is the reverse process of the folding process of the flexible display panel 1, i.e., when the flexible display panel 1 is unfolding, the rotating gear 21 moves along the rack 3 and drives the support component 4 connected with the rotating gear 21 to move towards the driving component 2 to realize the unfolding of the flexible display panel 1, which will not be described herein.

In an embodiment of the present application, the rotating gear 21 may be connected with the support component 4 and the rack 3 is connected with the driving component 2; or the rotating gear 21 may be connected with the driving component 2 and the rack 3 is connected with the support component 4; and the embodiments of the present application does not limit the setting position of the rotating gear 21 and the rack 3. However, in order to realize a relative motion of the support component 4 and the driving component 2 at the same time when folding or unfolding, a preferred embodiment is that the rotating gear 21 is connected with the driving component 2 and the rack 3 is connected with the support component 4. When the flexible display panel 1 is folding or unfolding, the drive component 2 can directly drive the rotating gear 21 to rotate to realize the relative position of the support component 4 and the drive component 2 at the same time.

In an embodiment of the present application, the support component further includes a bending driving mechanism, which is used for driving the flexible display panel 1 to fold or unfold. In a further embodiment of the present application, the bending driving mechanism may be a driving mechanism, such as a motor, which can provide a continuous driving force. A power output shaft of the motor is connected with the rotating gear 21. The motor provides power, and the power output shaft drives the rotating gear 21 to rotate along the rack 3 and move relative to the rack 3, thereby driving drive the relative movement of the support component 4 and the driving component 2, so as to realize the folding or unfolding of the flexible display panel 1. By setting the bending driving mechanism, the folding or unfolding efficiency of the flexible display panel can be improved, and the workload required for manual folding or unfolding can also be saved.

Figure 2A:
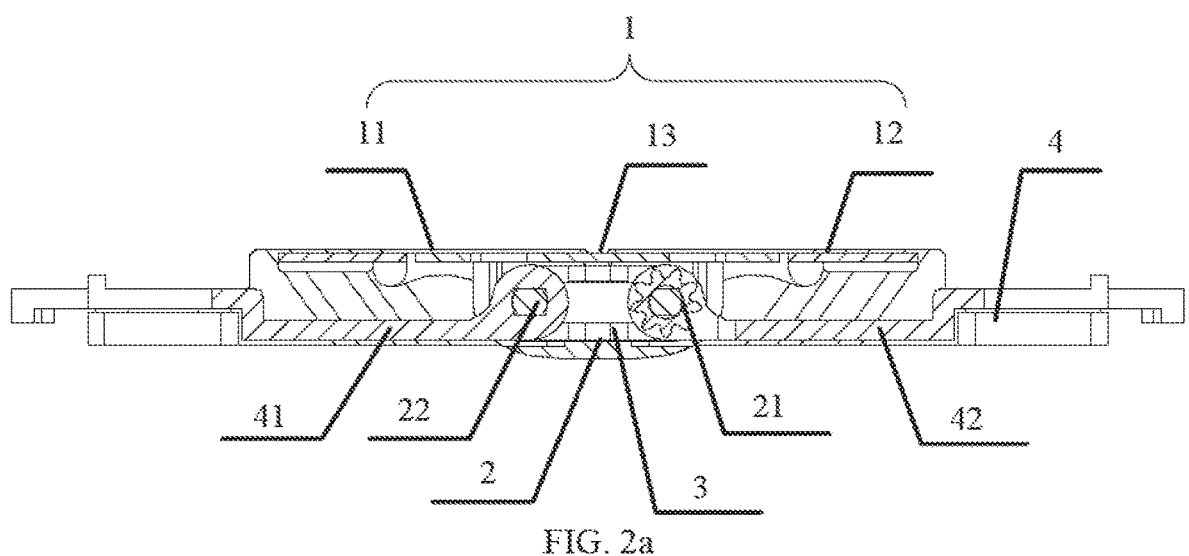
FIG. 2a is a schematic structural diagram of a foldable support device in an unfolded state according to another embodiment of the present application.
Figure 2B:
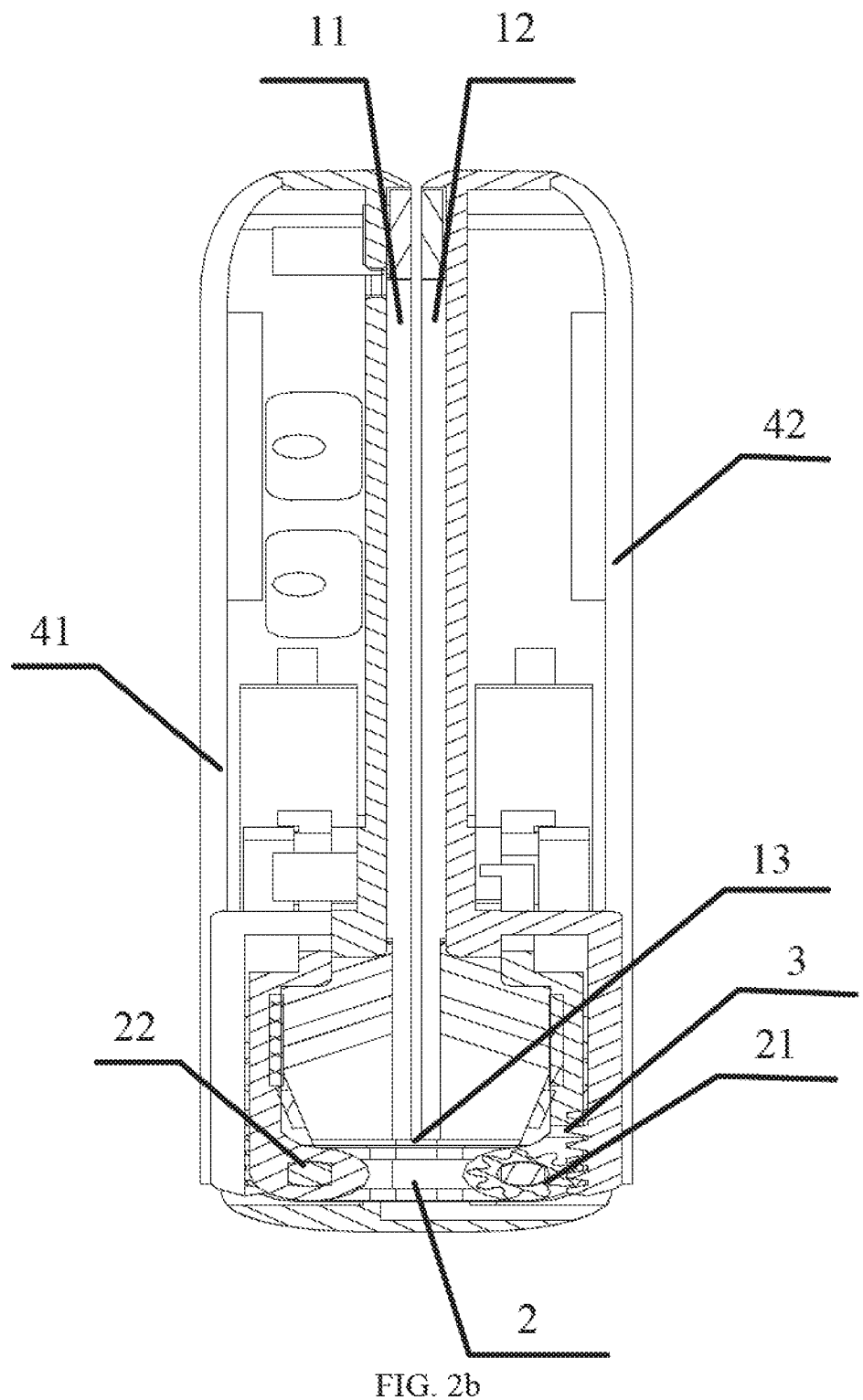
FIG. 2b is a schematic structural diagram of a foldable support device in a folded state according to another embodiment of the present application.

FIG. 2a and FIG. 2b are respectively a schematic structural diagram of a foldable support device in an unfolded state and in a folded state according to another embodiment of the present application. As shown in FIG. 2a and FIG. 2b, the flexible display panel 1 may include a first area 11, a second area 12, and a bending area 13 located between the first area 11 and the second area 12. When the flexible display panel 1 is folding, the rotating gear 21 rotates along the rack 3 and moves relative to the rack 3, thereby driving the first area 11 or the second area 12 of the flexible display panel 1 to fold while the support component 4 moving away from the driving component 2. By setting the rotating gear 21 and the rack 3, when the flexible display panel 1 is folding, the rotating gear 21 rotates along the rack 3 and moves relative to the rack 3, driving the support component 4 to move away from the driving component 2. Sufficient storage space is generated to effectively prevent the display failure caused by folding of the flexible display panel 1.

In an embodiment of the present application, the flexible display panel 1 may be an integrated screen panel structure. In order to express conveniently and clearly, the flexible display panel 1 is divided into three portions: the first area 11, the second area 12 and the bending area 13. The flexible display panel 1 can also be composed of three portions: the first area 11, the second area 12 and the bending area 13, which are separated from each other. The specific structure of the flexible display panel is not limited in the embodiments of the present application.

In an embodiment of the present application, the support component 4 includes at least one shell structure which is used for supporting and fixing the non-bending area of the flexible display panel 1. Optimally, the at least one shell structure may include a first shell 41 and a second shell 42. The first shell 41 and the second shell 42 respectively support and fix the first area 11 and the second area 12 of the flexible display panel 1 in the above-mentioned embodiment. When the flexible display panel 1 is folding, the rotating gear 21 rotates along the rack 3 and moves relatively to the rack 3, driving the at least one shell structure to move away from the driving component 2. Sufficient storage space is generated for the bending area 13 of the flexible display panel 1 to effectively prevent the display failure caused by folding of the flexible display panel 1.

In an embodiment of the present application, the support device may include a plurality of racks 3 and a plurality of rotating gears 21 which meshed respectively with the plurality of racks 3. When the flexible display panel 1 is folding, the rotating gear 21 rotates along the rack 3 and moves relatively to the rack 3, thereby driving the at least one shell structure to move away from the driving component 2. Sufficient storage space is generated for the bending area 13 of the flexible display panel 1 to effectively prevent the display failure caused by folding of the flexible display panel 1.

In an embodiment of the present application, a quantity of the racks and the rotating gears in the embodiments of this present application may be determined according to the actual application scenario. As long as the quantity of the racks and the rotating gears can realize the folding operation of the flexible display panel, the embodiments of the present application does not limit the quantity of the racks and the rotating gears.

In an embodiment of the present application, a quantity of the racks or the rotating gears connected with each shell structure in embodiments of this present application may be determined according to the actual application scenario, which may be that each shell structure is connected with only one rack or one rotating gear, or each shell structure is connected with a plurality of racks or rotating gears. As long as the quantity of the racks and the rotating gears connected with each shell structure can realize the folding operation of the flexible display panel, the embodiments of the present application does not limit the quantity of the racks and the rotating gears connected with each shell structure.

In an embodiment of the present application, the rack 3 may only be set on the first shell 41. When the flexible display panel 1 is folding or unfolding, the first shell 41 is driven to move away from or close to the driving component 2 while the rotating gear 21 rotates along the rack 3. Or, the rack 3 may only be set on the second shell 42. When the flexible display panel 1 is folding or unfolding, the second shell 42 is driven to move away from or close to the driving component 2 while the rotating gear 21 rotates along the rack 3. Or, the racks 3 may both be set on the first shell 41 and the second shell 42. When the flexible display panel 1 is folding or unfolding, the first shell 41 and the second shell 42 are driven to move away from or close to the driving component 2 while the rotating gears 21 rotates along the racks 3.

Figure 3:
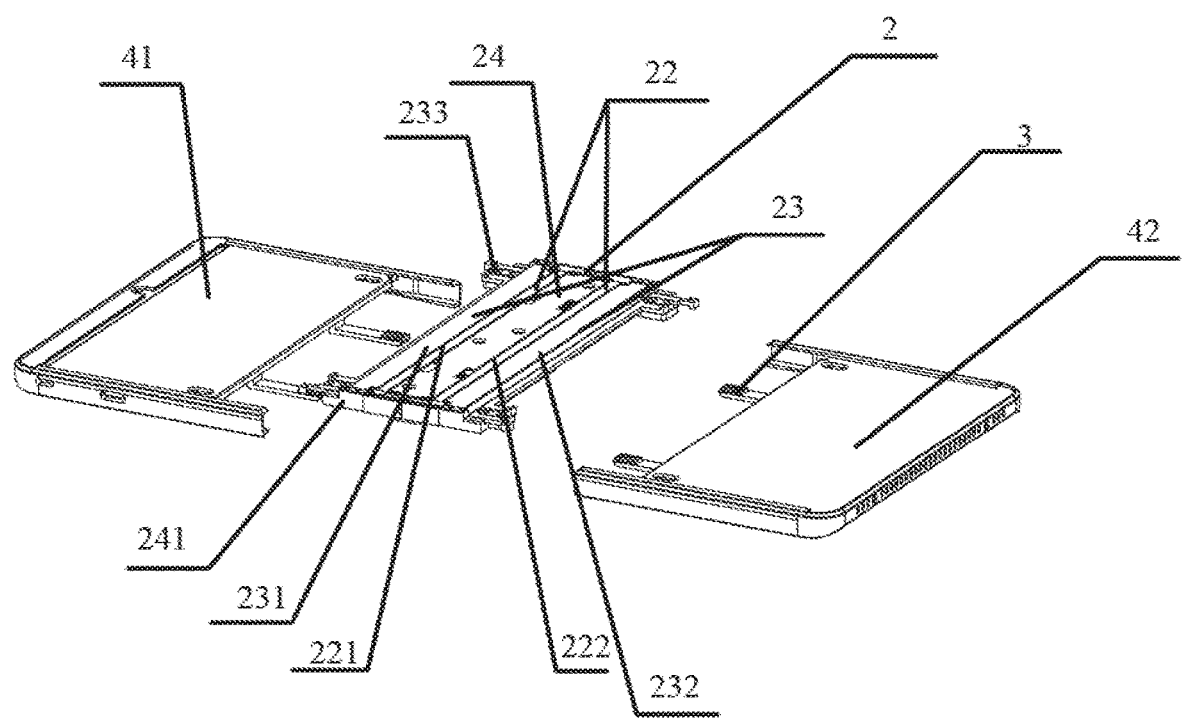
FIG. 3 is a schematic structural diagram of a foldable support device according to an embodiment of the present application.

FIG. 3 is a schematic structural diagram of a foldable support device according to an embodiment of the present application. In order to more clearly show the location and connection relationship of the structural components of the embodiment, FIG. 3 shows the engineering explosion diagram of the product. As is shown in FIG. 3, the driving component 2 further includes a rotating shaft 22, a rotating portion 23 and a fixed portion 24, and the rotating portion 23 is rotatably connected with the fixed portion 24 through the rotating shaft 23. The fixed portion 24 supports the non-bending area of the flexible display panel 1, and the rotating portion 23 supports and fixes the bending area of the flexible display panel 1. The rotating gear 21 may be disposed on the rotating shaft 22. When the rotating portion 23 rotates around the fixed portion 24 through the rotating shaft 22, the flexible display panel 1 is driven to fold or unfold, so as to realize the folding or unfolding of the flexible display panel 1. And At the same time, the rotating gear 21 is driven to rotate along the rack 3 and move relatively to the rack 3, so as to realize the movement of the support component 4 away from or close to the driving component 2. Sufficient storage space is provided for the bending area 13 of the flexible display panel 1, so as to prevent the display failure of the flexible display panel 1 due to folding.

In an embodiment of the present application, the rotating shaft 22 includes a first rotating shaft 221 and a second rotating shaft 222 arranged in parallel. The rotating portion 23 includes a first rotating portion 231 and a second rotating portion 232 respectively disposed at both ends of the fixed portion 24. The first rotating portion 231 is rotatably connected with the fixed portion 24 through the first rotating shaft 221, and the second rotating portion 232 is rotatably connected with the fixed portion 24 through the second rotating shaft 222. The first rotating portion 231 is rotatably connected with the first shell 41, and the first rotating portion 231 and the first shell 41 can make relative movement along the direction of the rack 3 disposed on the first shell 41, so as to realize the relative movement of the first shell 41 and the rotating portion 23. The second rotating portion 232 is rotatably connected with the second shell 42, and the second rotating portion 232 and the second shell 42 can make relative movement along the direction of the rack 3 disposed on the second shell 42, so as to realize the relative movement of the second shell 42 and the rotating portion 23. When the flexible display panel 1 is folding, the first rotating portion 231 rotates around the fixed portion 24 through the first rotating shaft 221 and drives the first shell 41 to rotate and move away from the rotating portion 23; and the second rotating portion 232 rotates around the fixed portion 24 through the second rotating shaft 222 and drives the second shell 42 to rotate and move away from the rotating portion 23, so as to realize the first shell 41, the first area 11 and the second shell 42, the second area 12 are closely stored. And when the flexible display panel is unfolding, the unfolding process is a reverse process of the folding process of the flexible display panel 1, which will not be described herein. By setting the double shaft structure with the first rotating shaft 221 and the second rotating shaft 222, the independent rotation of the first shell 41 and the second shell 42 can be realized, and the efficiency and flexibility of folding or unfolding of the flexible display panel 1 can be improved.

In a further embodiment of the present application, a worm gear structure is disposed between the first rotating shaft 221 and the second rotating shaft 222, and the first rotating shaft 221 and the second rotating shaft 222 are respectively connected with the worm gear structure. By setting the worm gear structure between the first rotating shaft 221 and the second rotating shaft 222, the first rotating shaft 221 and the second rotating shaft 222 are linked by the worm gear structure, so as to realize a synchronous rotation of the first rotating shaft 221 and the second rotating shaft 222, and the efficiency of folding or unfolding is further improved.

In an embodiment of the present application, different transmission structures may be selected according to the actual application scenarios to realize a rotating transmission of the first rotating shaft and second rotating shaft, such as a rotating gear and a rack. The transmission structure that connecting the first and second rotating shafts in the embodiments of this present application includes but is not limited to the worm gear structure.

Figure 4:
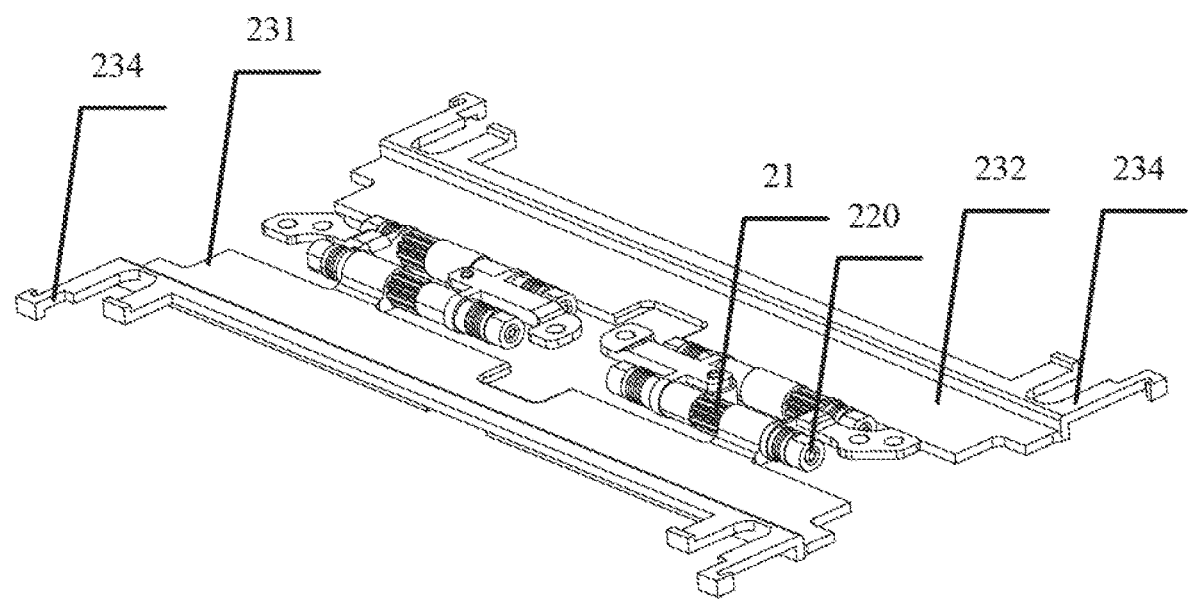
FIG. 4 is a schematic structural diagram of a driving component in a foldable support device according to an embodiment of the present application.

FIG. 4 is a schematic structural diagram of a driving component in a foldable support device according to an embodiment of the present application. As is shown in FIG. 3 and FIG. 4, a sliding portion 233 is disposed on the rotating portion 23, a sliding channel is disposed on the at least one shell structure, and the sliding portion 233 is disposed in the sliding channel and slides along the sliding channel. Preferably, the rotating portion 23 includes a first rotating portion 231 and a second rotating portion 232. The at least one shell structure includes the first shell 41 and the second shell 42. A first sliding portion may be disposed on the first rotating portion 231; a first sliding channel may be disposed on the first shell 41; and the first sliding portion is set in the first sliding channel and slides along the first sliding channel. And/or, a second sliding portion may be disposed on the second rotating portion 232; a second sliding channel may be disposed on the second shell 42; and the second sliding portion is set in the second sliding channel and slides along the second sliding channel.

In this embodiment of this present application, the sliding portions are disposed on both sides of the rotating portion 23, and the sliding channels are disposed on the corresponding positions of both sides of the at least one shell structure. When the rotating portion 23 moves relative to the at least one shell structure, the sliding portions 233 slide in the sliding channels to realize the edge limit, so as to ensure the relative movement of the rotating portion 23 and the at least one shell structure.

In an embodiment of the present application, only the sliding channels may be set on the first shell 41, and the first sliding portions are set on the first rotating portion 231; or only the sliding channels may be set on the second shell 42, and the second sliding portions are set on the second rotating portion 232; or the sliding channels may be set on both the first shell 41 and the second shell 42, the first sliding portions are disposed on the first rotating portion 231, and the second sliding portions are set on the second rotating portion 232. The embodiments of the present application do not limit the setting manner of the sliding portions and the sliding channels.

Figure 5:
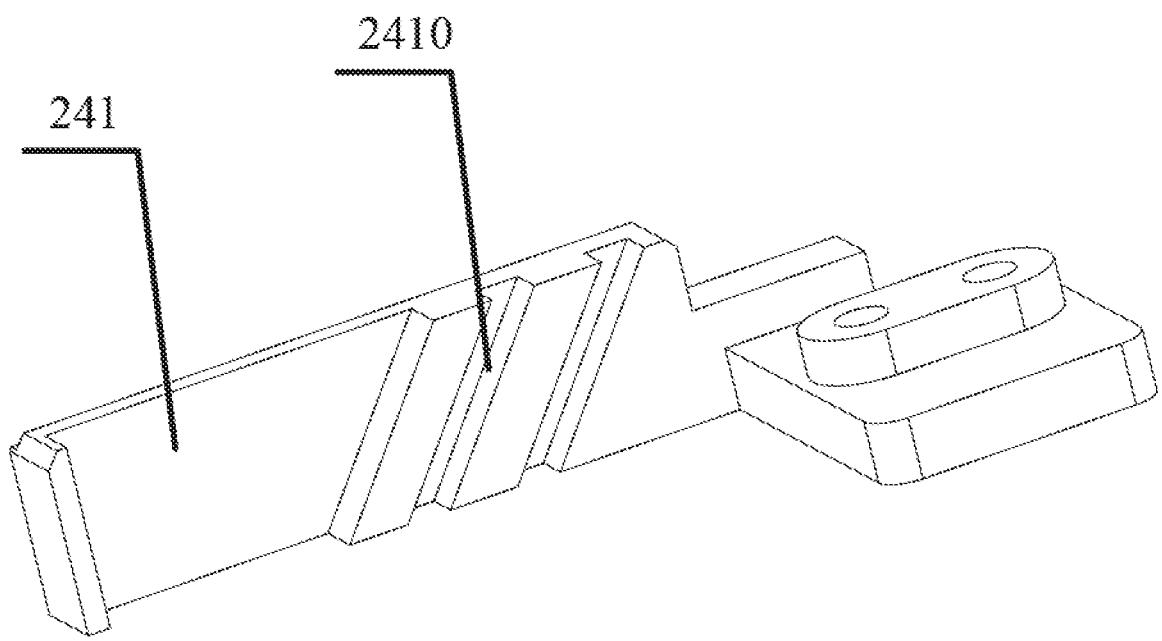
FIG. 5 is a schematic structural diagram of a slide groove fixed portion in a foldable support device according to an embodiment of the present application.

FIG. 5 is a schematic structural diagram of a slide groove fixed portion in a foldable support device according to an embodiment of the present application. As is shown in FIG. 5, a slide groove fixed portion 241 (as is shown in FIG. 3) is disposed on the fixed portion 24, a slide groove 2410 is disposed on the slide groove fixed portion 241, an end slide block 234 is disposed on the rotating portion 23, and the end slide block 234 is disposed in the slide groove 2410 and slides along the slide groove 2410. In this embodiment of this present application, when the rotating portion rotates around the fixed portion, the end slide block slides in the slide groove of the slide groove fixed portion to realize the end position limitation, by disposing the slide groove fixed portion on the fixed portion and the end slide block 234 on one end of the rotating portion.

In an embodiment of this present application, a first slide groove fixed portion 241 is set on the fixed portion 24, a first slide groove is disposed on the first slide groove fixed portion, a first end slide block is disposed on an one end of the first rotating portion 231, and the first end slide block is disposed in the first slide groove and slides along the first slide groove. Or/and, a second slide groove fixed portion 241 is disposed on the fixed portion 24, a second slide groove is disposed on the second slide groove fixed portion, a second end slide block is disposed on an one end of the second rotating portion 232, and the second end slide block is disposed in the second slide groove and slides along the second slide groove. In this embodiment of this present application, when the first rotating portion or/and the second rotating portion rotates around the fixed portion, the end slide block slides in the slide groove of the slide groove fixed portion to realize the end position limitation, by disposing the slide groove fixed portion on the fixed portion and the end slide block on one end of the first rotating portion or/and one end of the second rotating portion.

In an embodiment of the present application, only the first slide groove fixed portion is disposed on the fixed portion 24, and the first end slide block is disposed on the first rotating portion 231; or only the second slide groove fixed portion is disposed on the fixed portion 24, and the second end slide block is disposed on the second rotating portion 232; or the first slide groove fixed portion and the second slide groove fixed portion are both disposed on the fixed portion 24, and the first end slide block and the second end slide block are disposed on the first rotating portion 231 and the second rotating portion 232 respectively. The embodiments of this present application do not limit the setting manner of the slide groove fixed portion and the end slide block.

In an embodiment of the present application, a plurality of end slide blocks 234 are disposed on the rotating portion 23, as shown in FIG. 4, a plurality of slide grooves 2410 corresponding to the end slide blocks 234 are disposed on the slide groove fixed portion 241 (as shown in FIG. 5), and the plurality of end slide blocks 234 are respectively disposed in the plurality of slide grooves 2410. Preferably, a plurality of first end slider blocks may be disposed on the first rotating portion 231, a plurality of first slide grooves are disposed on the first slide groove fixed portion and the plurality of first end slide blocks are respectively disposed in the plurality of first slide grooves; and/or a plurality of second end slider blocks may be disposed on the second rotating portion 232, a plurality of second slide grooves are disposed on the second slide groove fixed portion and the plurality of second end slide blocks are respectively disposed in the plurality of second slide grooves. By setting multiple end slide blocks and multiple slide grooves in parallel, the deviation of the position with single end slide block and single slide groove can be prevented, and the limit accuracy is improved.

In an embodiment of the present application, only a plurality of first end slide blocks may be disposed on the first rotating portion 231, and a plurality of first slide grooves are disposed on the first slide groove fixed portion; or only a plurality of second end slide blocks may be disposed on the second rotating portion 231, and a plurality of second slide grooves are disposed on the second slide groove fixed portion; or a plurality of first end slide blocks and a plurality of second end slide blocks may be respectively disposed only on the first rotating portion 231 and the second rotating portion 232, and a plurality of first slide grooves and a plurality of second slide grooves are respectively disposed on the first slide groove fixed portion and the second slide groove fixed portion. The setting manner of the slide groove fixed portion and the end slide block is not limited.

In an embodiment of the present application, different quantities of slide grooves and end slide blocks may be selected according to the requirements of the actual application scenario. As long as the selected quantities of the slide grooves and the end slide blocks can meet the precise limit of the end slide blocks in the slide grooves when the first rotating portion and the second rotating portion rotate around the fixed portion. The quantities of the slide grooves and the end slider blocks in the embodiments of this present application include but are not limited to two.

In an embodiment of the present application, the slide groove 2410 may be a linear slide groove, and an angle between a straight line direction of the slide groove 2410 is located in and a plane where the flexible display panel 1 located is greater than zero and less than ninety degrees. By setting the direction of the linear slide groove, it is ensured that the end slide block can slide and be limited the position in the linear slide groove when the rotating portion rotates around the fixed portion.

In an embodiment of the present application, different slide groove shapes may be selected according to the rotation radian of the rotating portion around the fixed portion. As long as the selected slide groove shape can meet that the end slide block sliding and being limited the position in the linear slide groove when the rotating portion rotating around the fixed portion, the slide groove shape in the embodiment of the present application includes but is not limited to the linear shape.

In an embodiment of the present application, a shaft locking portion 220 is disposed on the rotating shaft 22. By setting the shaft locking portion 220 at one end of the rotating shaft 22, when the flexible display panel support device needs to be fixed in a certain state, the shaft locking portion 220 is used for fixing the rotating shaft 22 in the certain state. In an embodiment of the present application, the certain state needs to be fixed in the embodiment of this present application may be the folded state, the unfolded state and any state from the folded state to the unfolded state, and the embodiment of this present application does not limit the certain state.

An embodiment of the present application provides a foldable flexible display device, including: a flexible display panel for performing a display function; and a foldable support device for supporting the flexible display panel, which adopts the structure of the foldable support device according to any one of the above mentioned. By setting a rotating gear and a rack, when the flexible display panel is folding, the rotating gear rotates along the rack and drives the support component to move away from the driving component. During a process of the foldable flexible display device from an unfolded state to a folded state (i.e., the bending angle of the flexible display panel becomes greater and greater), sufficient storage space is generated for the flexible display panel while bending to effectively prevent the display failure caused by folding of the flexible display panel.

In an embodiment of the present application, the flexible display panel includes a circuit board. The circuit board is disposed in the at least one shell structure. The circuit board is used for providing a driving circuit required by the flexible display panel. In an embodiment of the present application, different positions to set the circuit board may be chosen according to the requirements of the actual application scenario (such as the internal capacity of the at least one shell structure, etc.), and the embodiments of this present application do not limit the setting position of the circuit board.

In a further embodiment of the present application, the circuit board may be a flexible circuit board. Since the flexible circuit board has a bending performance, the circuit board in the embodiment can be disposed at the driving component.

In an embodiment of the present application, the flexible display panel may include a battery. The battery is disposed in the at least one shell structure. The battery is used for providing power required by the circuit board. different positions to set the circuit board may be chosen, different positions to set the battery may be chosen according to the requirements of the actual application scenario (such as the internal capacity size of the at least one shell structure, etc.), and the embodiments of this present application do not limit the setting position of the battery.

In a further embodiment of the present application, the battery may be a flexible battery. Since the flexible battery has a bending performance, the battery in the embodiment can be disposed at the driving component.

The above embodiments are only the preferred embodiments of the present application, and that are not intended to limit the present application. Any modifications, equivalents, and the like made within the spirit and principles of the present application should be included in the scope of the present application.

What is claimed is:

1. A foldable support device, comprising:
   a driving component,
   a support component connected with the driving component; and
   a rotating gear and a rack, intermeshing with each other and connected with the driving component and the support component;
   wherein the driving component and the support component are disposed on a non-display surface of a flexible display panel;
   wherein the rotating gear and the rack intermesh with each other to rotate and have a relative movement therebetween to fold or unfold the flexible display panel;
   wherein the driving component further comprises a rotating shaft, a rotating portion and a fixed portion, and the rotating portion is rotatably connected with the fixed portion through the rotating shaft;
   wherein the rotating shaft comprises a first rotating shaft and a second rotating shaft arranged in parallel, the rotating portion comprises a first rotating portion and a second rotating portion respectively disposed at both ends of the fixed portion, the first rotating portion is rotatably connected with the fixed portion through the first rotating shaft, the second rotating portion is rotatably connected with the fixed portion through the second rotating shaft, a worm gear structure is disposed between the first rotating shaft and the second rotating shaft, and the first rotating shaft and the second rotating shaft are respectively connected with the worm gear structure.

2. The foldable support device of claim 1, wherein the rotating gear is connected with the driving component, the rack is connected with the support component, and the rotating gear rotates along the rack and moves relatively to the rack, driving the driving component connected with the rotating gear to move relatively to the support component connected with the rack.

3. The foldable support device of claim 1, wherein the rotating gear is connected with the support component; the rack is connected with the driving component; and the rotating gear rotates along the rack and moves relatively to the rack, driving the support component connected with the rotating gear to move relatively to the driving component connected with the rack.

4. The foldable support device of claim 1, wherein the support component comprises at least one shell structure; the at least one shell structure is used for supporting and fixing a non-bending area of the flexible display panel.

5. The foldable support device of claim 1, wherein the foldable support device comprises a plurality of the racks and a plurality of the rotating gears which are respectively meshed with the plurality of the racks.

6. The foldable support device of claim 1, wherein the rotating portion has a sliding portion disposed thereon, the at least one shell structure has a sliding channel disposed thereon, and the sliding portion is disposed in the sliding channel and slides along the sliding channel.

7. The foldable support device of claim 1, wherein a shaft locking portion is disposed on the rotating shaft.

8. The foldable support device of claim 1, wherein the foldable support device further comprises a bending driving mechanism connected to the rotating gear, used for driving the rotating gear to rotate along the rack and move relatively to the rack.

9. The foldable support device of claim 8, wherein the bending driving mechanism comprises a motor.

10. The foldable support device of claim 1, wherein the fixed portion has a slide groove fixed portion disposed thereon, the slide groove fixed portion has a slide groove disposed thereon, the rotating portion has an end slide block disposed thereon, and the end slide block is disposed in the slide groove and slides along the slide groove.

11. The foldable support device of claim 10, wherein the rotating portion has a plurality of the end slide blocks disposed thereon, the slide groove fixed portion has a plurality of the slide grooves corresponding to the plurality of the end slide blocks disposed thereon, and the plurality of the end slide blocks are respectively disposed in the plurality of the slide grooves.

12. The foldable support device of claim 10, wherein the slide groove is a linear slide groove and an angle between a straight line direction of the slide groove and a plane where the flexible display panel located is greater than zero and less than ninety degrees.

13. A foldable support device, comprising:
   a driving component,
   a support component connected with the driving component; and
   a rotating gear and a rack, intermeshing with each other and connected with the driving component and the support component;
   wherein the driving component and the support component are disposed on a non-display surface of a flexible display panel;
   wherein the rotating gear and the rack intermesh with each other to rotate and have a relative movement therebetween to fold or unfold the flexible display panel;
   wherein the driving component further comprises a rotating shaft, a rotating portion and a fixed portion, and the rotating portion is rotatably connected with the fixed portion through the rotating shaft; wherein the fixed portion has a slide groove fixed portion disposed thereon, the slide groove fixed portion has a slide groove disposed thereon, the rotating portion has an end slide block disposed thereon, and the end slide block is disposed in the slide groove and slides along the slide groove.

14. The foldable support device of claim 13, wherein the rotating portion has a plurality of the end slide blocks disposed thereon, the slide groove fixed portion has a plurality of the slide grooves corresponding to the plurality of the end slide blocks disposed thereon, and the plurality of the end slide blocks are respectively disposed in the plurality of the slide grooves.

15. The foldable support device of claim 13, wherein the slide groove is a linear slide groove and an angle between a straight line direction of the slide groove and a plane where the flexible display panel located is greater than zero and less than ninety degrees.

16. A foldable flexible display device, comprising:
a flexible display panel for performing a display function; and
a foldable support device, comprising:
a driving component;
a support component connected with the driving component;
a rotating gear and a rack, intermeshing with each other and connected with the driving component and the support component;
wherein the driving component and the support component are disposed on a non-display surface of the flexible display panel;
wherein the rotating gear and the rack intermesh with each other to rotate and have a relative movement therebetween to fold or unfold the flexible display panel;

wherein the driving component further comprises a rotating shaft, a rotating portion and a fixed portion, and the rotating portion is rotatably connected with the fixed portion through the rotating shaft;
wherein the rotating shaft comprises a first rotating shaft and a second rotating shaft arranged in parallel, the rotating portion comprises a first rotating portion and a second rotating portion respectively disposed at both ends of the fixed portion, the first rotating portion is rotatably connected with the fixed portion through the first rotating shaft, the second rotating portion is rotatably connected with the fixed portion through the second rotating shaft, a worm gear structure is disposed between the first rotating shaft and the second rotating shaft, and the first rotating shaft and the second rotating shaft are respectively connected with the worm gear structure.

17. The foldable flexible display device of claim 16, wherein the flexible display panel comprises:
a circuit board, disposed in the at least one shell structure, and used for providing a driving circuit required by the flexible display panel.

18. The foldable flexible display device of claim 17, wherein the circuit board comprises a flexible circuit board.

19. The foldable flexible display device of claim 17, wherein the flexible display panel comprises:
a battery disposed in the at least one shell structure, and used for providing power required by the circuit board.

20. The foldable flexible display device of claim 19, wherein the battery comprises a flexible battery.

* * * * *